(12) United States Patent
Ghannam et al.

(10) Patent No.: US 10,464,382 B2
(45) Date of Patent: Nov. 5, 2019

(54) DYNAMIC TOW HOOK

(71) Applicant: Ford Global Technologies, LLC, Dearborn, MI (US)

(72) Inventors: Mahmoud Yousef Ghannam, Canton, MI (US); Swadad A. Carremm, Canton, MI (US); Saied Nusier, Canton, MI (US); Mohamed Ridha Baccouche, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 135 days.

(21) Appl. No.: 15/707,551

(22) Filed: Sep. 18, 2017

(65) Prior Publication Data
US 2019/0084361 A1    Mar. 21, 2019

(51) Int. Cl.
| B60D 1/24 | (2006.01) |
|---|---|
| B60D 1/14 | (2006.01) |
| B60D 1/167 | (2006.01) |
| B60D 1/56 | (2006.01) |

(52) U.S. Cl.
CPC ............ *B60D 1/243* (2013.01); *B60D 1/143* (2013.01); *B60D 1/167* (2013.01); *B60D 1/56* (2013.01); *B60D 1/565* (2013.01)

(58) Field of Classification Search
CPC ................................ B60D 1/243; B60D 1/488
See application file for complete search history.

(56) References Cited

U.S. PATENT DOCUMENTS

| 1,991,684 | A | * | 2/1935 | Ketel | B60D 1/50 267/138 |
|---|---|---|---|---|---|
| 4,369,010 | A | * | 1/1983 | Ichinose | B60D 1/488 410/101 |
| 6,062,632 | A | * | 5/2000 | Brachos | B60R 19/00 296/187.03 |
| 7,290,783 | B2 | | 11/2007 | Dornbos | |
| 7,758,060 | B2 | * | 7/2010 | Lopez | B60D 1/488 280/495 |

FOREIGN PATENT DOCUMENTS

| CN | 202345319 U | 7/2012 |
|---|---|---|
| CN | 203254911 U | 10/2013 |
| CN | 104044419 A | 9/2014 |
| CN | 105564166 A | 5/2016 |
| JP | 2004136745 A | 5/2004 |

* cited by examiner

*Primary Examiner* — Joseph M Rocca
*Assistant Examiner* — Harold Eric Pahlck, III
(74) *Attorney, Agent, or Firm* — Frank A. MacKenzie; Bejin Bieneman PLC

(57) ABSTRACT

A tow hook assembly includes a U-shaped tow hook received in a housing. The U-shaped tow hook includes first and second legs where the first and second legs each include forward and rearward locking flanges. The legs of the U-shaped tow hooks are received in a housing. The housing includes springs which bias the U-shaped tow hook in a forward direction and the locking flanges prevent the U-shaped tow hook from moving in a forward direction. The springs allow the U-shaped tow hook to deflect in a rearward direction upon a forward impact with the U-shaped tow hook.

9 Claims, 4 Drawing Sheets

DYNAMIC TOW HOOK

BACKGROUND

Vehicles may include tow hooks. These tow hooks are often positioned at the front of a vehicle and protrude through or under a vehicle bumper or bumper facia so that tow straps may be attached to a vehicle to allow, for example, a vehicle to be towed. Tow hooks are typically robust and as such are made from a steel rod, formed into a hook. Since the tow hooks are positioned at the front of a vehicle, sometimes termed the A-Surface, the hooks may be the first point of impact where a vehicle hits an object. A need has arisen to mitigate the impact force of a tow hook in those circumstances where the tow hook impacts an object.

DETAILED DESCRIPTION

Figure 1:
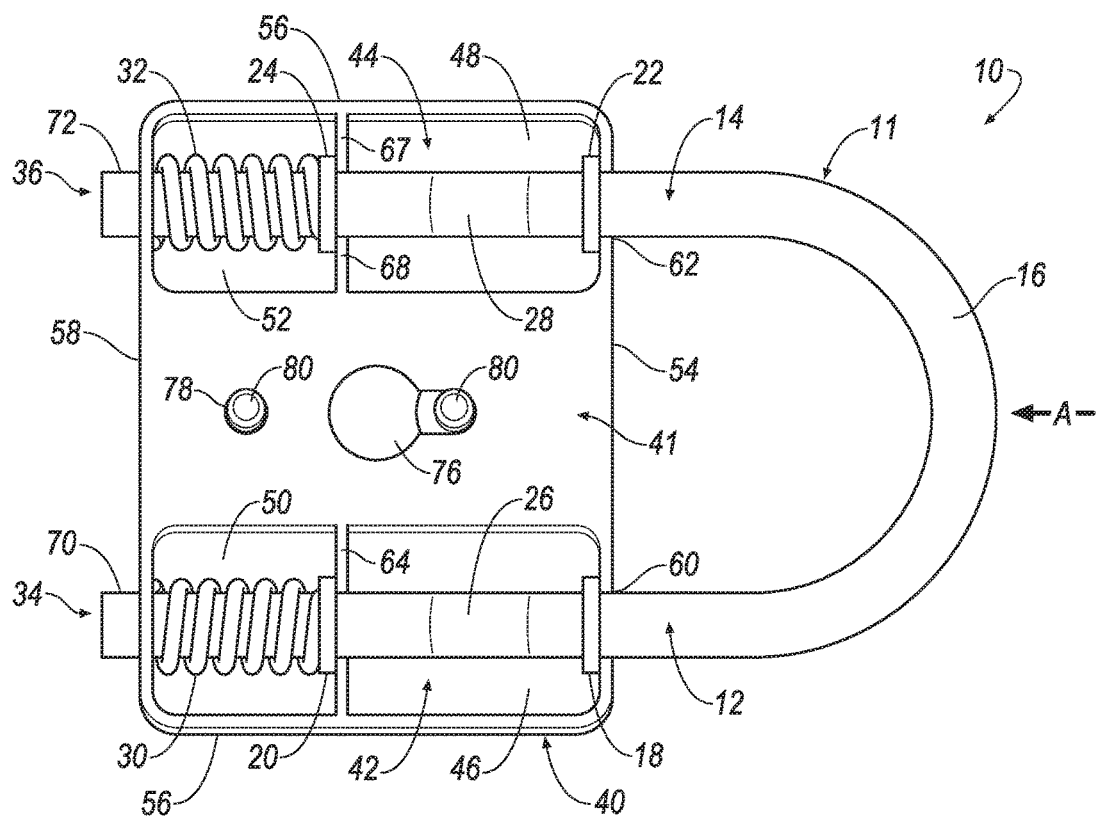
FIG. 1 is a top plan view of a vehicle tow hook assembly including a pair of biasing members to deflect a tow hook upon forward impact.
Figure 2:
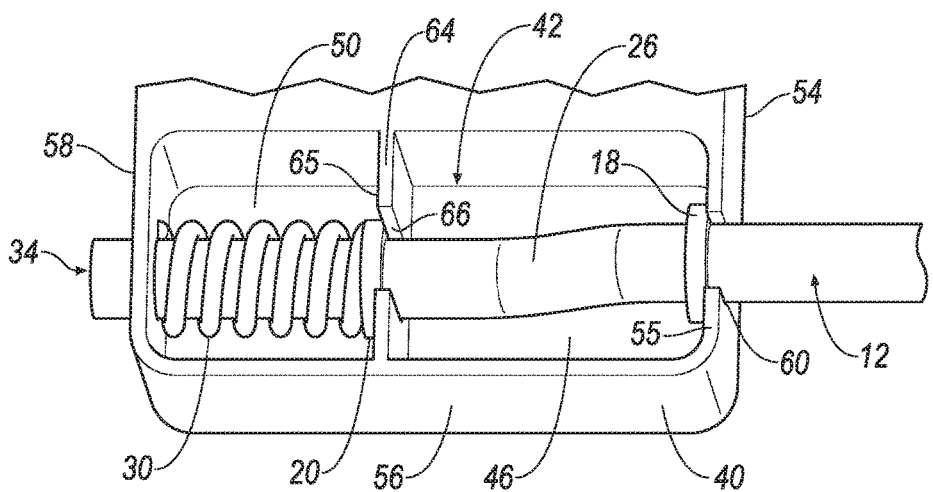
FIG. 2 is a partial perspective view of the tow hook of FIG. 1.

With reference to the Figures, wherein like numerals indicate like parts throughout the several views, there is shown a tow hook assembly 10. The tow hook assembly 10 is biased to a forward position and upon impact with an object a tow hook 11 deflects rearward against the tension of a pair of biasing members 30, 32. The tow hook 11 is generally U-shaped and includes a hook rod 16, a first leg 12 and a second leg 14. First leg 12 includes a first rod end 34 and second leg 14 includes a second rod end 36. As shown the first leg 12 and the second leg 14 extend from a hook rod 16 to form the U-shape. The first leg 12 includes a forward locking flange 18 and a rearward locking flange 20. The second leg 14 includes a second leg forward locking flange 22 and a second leg rearward locking flange 24. In a first example locking flanges 18, 20, 22 and 24 have a circular profile. The locking flanges 18, 20, 22 and 24 may have other shapes, with non-limiting examples including an oval or a polygon shape. The tow hook 11 may be formed from a suitable metal including steel, for example spring steel or stainless steel. For smaller vehicles the rod may be 10 mm in diameter where for larger vehicles, for example trucks, the rod may be 20 mm in diameter or larger.

As shown, the tow hook 11 is received in a housing 40. The housing 40 includes a first leg cavity 42 and a second leg cavity 44. The first leg cavity 42 and the second leg cavity 44 are laterally separated by a central mounting block 41. The mounting block 41 is generally box shaped, includes mounting holes 70 and 72, and provides structural support for the housing 40. The housing 40 includes a forward wall 54, side walls 56 and a rear wall 58. Forward wall 54, side walls 56 and rear wall 58 are arranged to form a first leg cavity 42 and a second leg cavity 44, which as noted are laterally separated by the mounting block 41. The housing 40 may be made from any suitable material including sheet steel or aluminum.

The mounting block 41 includes an adjustable attachment hole 76 and a fixed attachment hole 78 sized to receive a pair of attachment fasteners 80. The attachment fasteners 80 are operable to attach the tow hook assembly to a vehicle as described in greater detail below.

The first leg cavity 42 is separated by a first middle wall 64 into a first forward cavity 46 and a first spring cavity 50. The second leg cavity 44 is separated by a second middle wall 67 into a second forward cavity 48 and a second spring cavity 52.

The forward wall 54 includes a first forward wall slot 60 and a second forward wall slot 62. Likewise the first middle wall 64 includes a first middle wall slot 66 and the second middle wall 67 includes a second middle wall slot 68. The first forward wall slot 60 is preferably co-linear with the first middle wall slot 66 and the second forward slot 62 is preferably co-linear the second middle wall slot 68. As shown, the slots 60, 62, 66 and 68 are sized to receive the first leg 12 and the second leg 14 of the tow hook 11 such that the first leg forward locking flange 18 and the second leg forward locking flange 24 are positioned against a rear side 55 of forward wall 54. In a similar fashion the first leg rearward locking flange 20 and the second leg rearward locking flange 22 are positioned against a rear side 65 of middle wall 64.

As shown the first biasing member 30 is received in the first spring cavity 50 and the second biasing member 32 is received in the second spring cavity 52. The biasing members 30, 32 as illustrated are coil springs that surround the first leg 12 and the second leg 14 respectively are compressed between the rear wall 58 and the middle wall 64 in order to bias the first and second leg forward locking flanges 18 and 22 against the rear side 55 of front wall 54 adjacent first forward towing wall slot 60 and adjacent second forward towing wall slot 62 respectively. When the tow hook 11 is in use for towing purposes, locking flanges 18, 20, 22 and 24 prevent the tow hook 11 from further movement in a forward direction. The locking flanges are formed with the tow hook 11 and sized to provide sufficient strength to withstand vehicle towing forces.

When hook rod 16 is impacted from a forward location in a direction of arrow A, the bias members 30 and 32 further compress and the tow hook 11 is deflected rearward. As the tow hook is deflected rearward the first rod end 34 and the second rod end 36 extend a greater distance through the first end wall hole 70 and the second end wall hole 72. As shown, rear wall 58 includes a first rear wall hole 70 and a second rear wall hole 72 through which the first rearward rod end 34 and the second rearward rod end 36 may be deflected upon impact.

In the example of the instant specification, the spring constant for first and second biasing member 30 and 32 may be calculated based on a relative vehicle speed of 40 kph (11.11 m/s), $C_2$, with an effective impact object mass, m, of 13.4 kg. Applying a spring mass analysis, based on the above stated values, the spring characteristics were then calculated as follows:

$$m\ddot{x} + kx = 0$$

-continued $$x(t) = C_1 \cos(\omega t) + C_2 \sin(\omega t),$$

$$\text{Where, } \omega = \sqrt{k/m}$$

$$x(0) = 0, \Rightarrow C_1 = 0$$

$$\dot{x}(0) = 11.11 = \omega C_2 \Rightarrow C_2 = \frac{11.11}{\omega}$$

$$x(t) = 11.11 \sqrt{\frac{m}{k}} \, \text{Sin} \sqrt{\frac{k}{m}} \, t$$

$$\ddot{x}(t) = -11.11 \sqrt{\frac{k}{13.4}} \, \text{Sin} \sqrt{\frac{k}{13.4}} \, t$$

$$a_{max} = 11.11 \sqrt{\frac{m}{k}}$$

$$k = \left(\frac{a_{max}}{11.11}\right)^2 * 13.4$$

Design for $a_{max} = 150$ g

Thus, $k = 235.1 \frac{KN}{m}$

So each spring, $$\bar{k} = 117.55 \, KN/m$$

And $$x(t^*) = 84 \, mm$$

It is believed that while a constant of 117.55 KN/m may be one example, a wider range of spring constants may be acceptable, for example, 110 KN/m to 125 KN/m or 117 KN/m to 118 KN/m.

Figure 3:
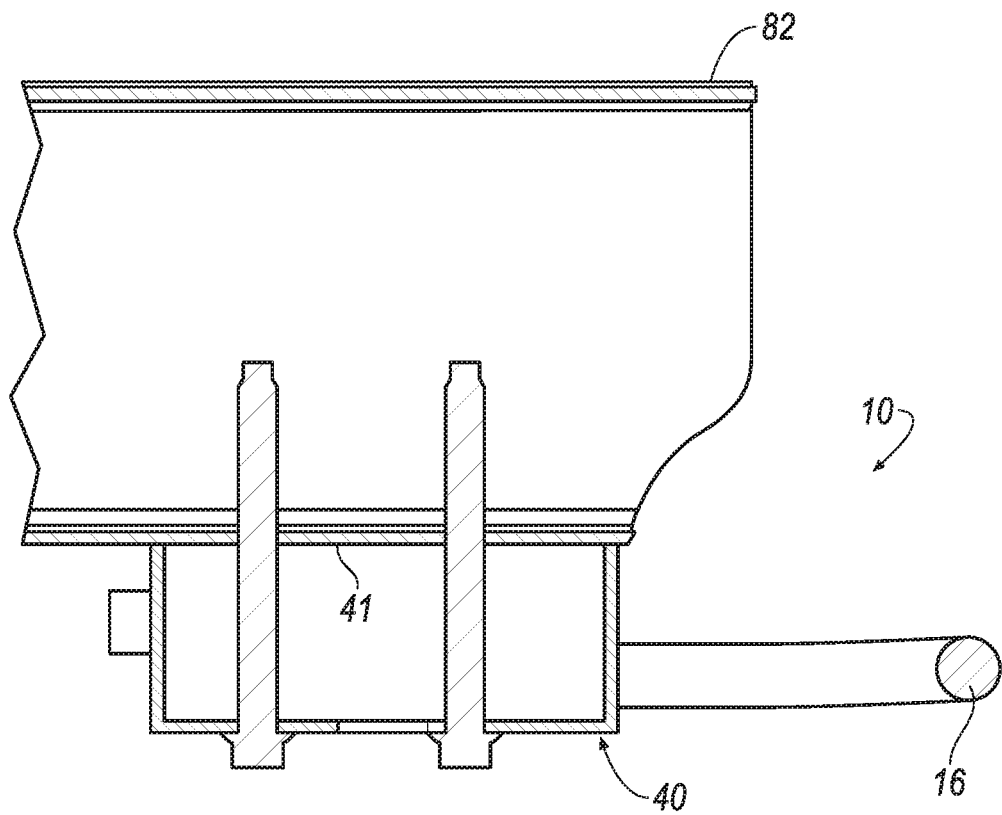
FIG. 3 is a partial side view of the vehicle tow hook of FIG. 1 as mounted on a frame rail of a vehicle.
Figure 4:
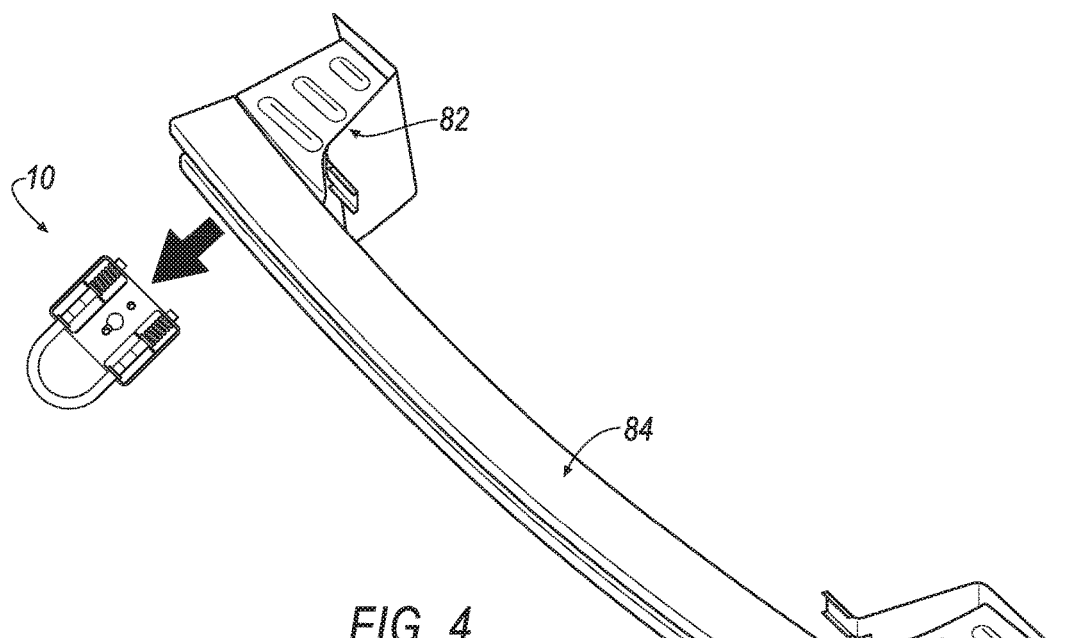
FIG. 4 is a perspective view of a pair of vehicle tow hooks mounted to a frame rail of a vehicle.
Figure 5:
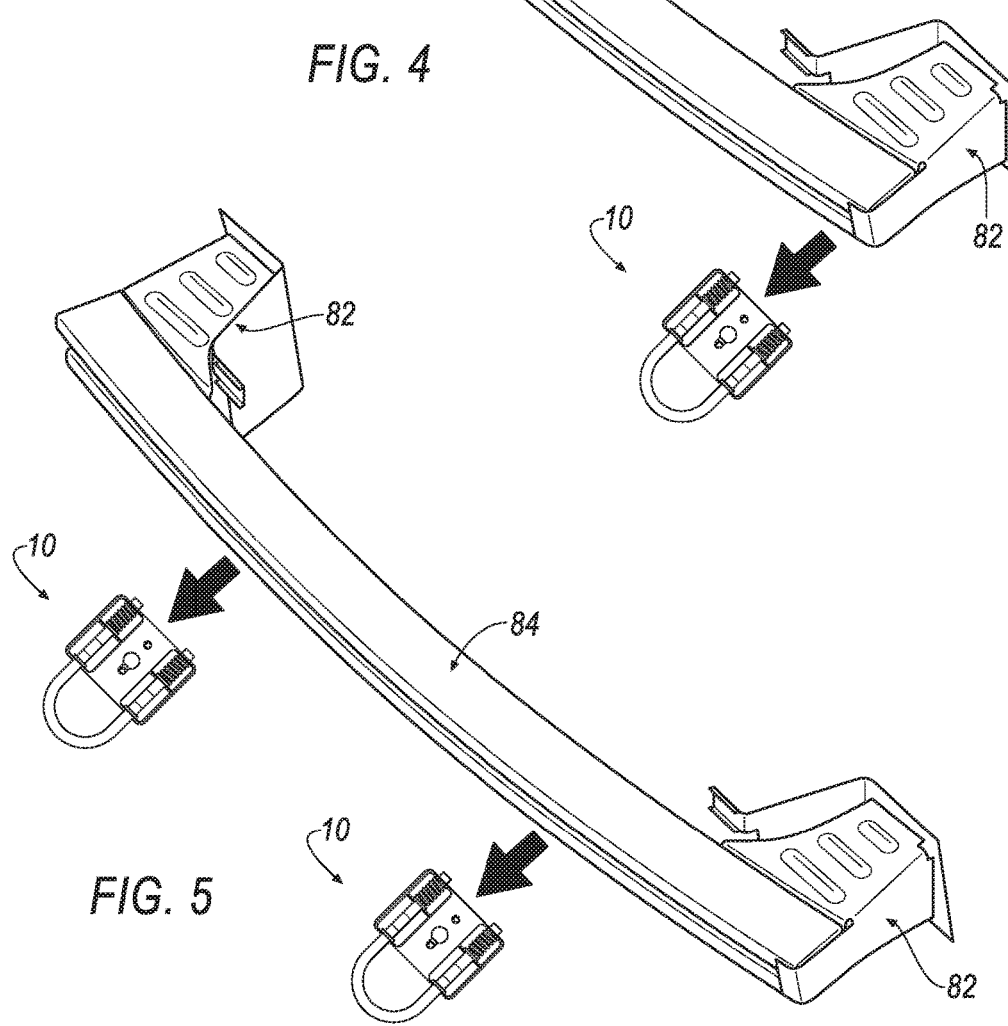
FIG. 5 is a perspective view of a pair of tow hooks mounted to a bumper beam of a vehicle.

With more specific reference to FIGS. 3 through 5 the tow hook assembly may be mounted on a vehicle. Examples include mounting the tow hook assembly on a frame rail 82 of the vehicle as shown in FIG. 4 or on a bumper beam 84 of the vehicle as shown in FIG. 5. In either of the examples of FIG. 4 or 5 it is understood that the hook 16 is accessible from the front of the vehicle and may protrude beyond a bumper facia of the vehicle as is understood in the art.

As shown in FIG. 3 the fasteners 80 may pass through the adjustable hole 76 and fixed hole 78 to fasten the tow hook assembly 10 to the vehicle. As is understood in the art, the adjustable hole 76 provides a degree of flexibility when mounting the tow hook assembly 10 to the vehicle.

Figure 6:
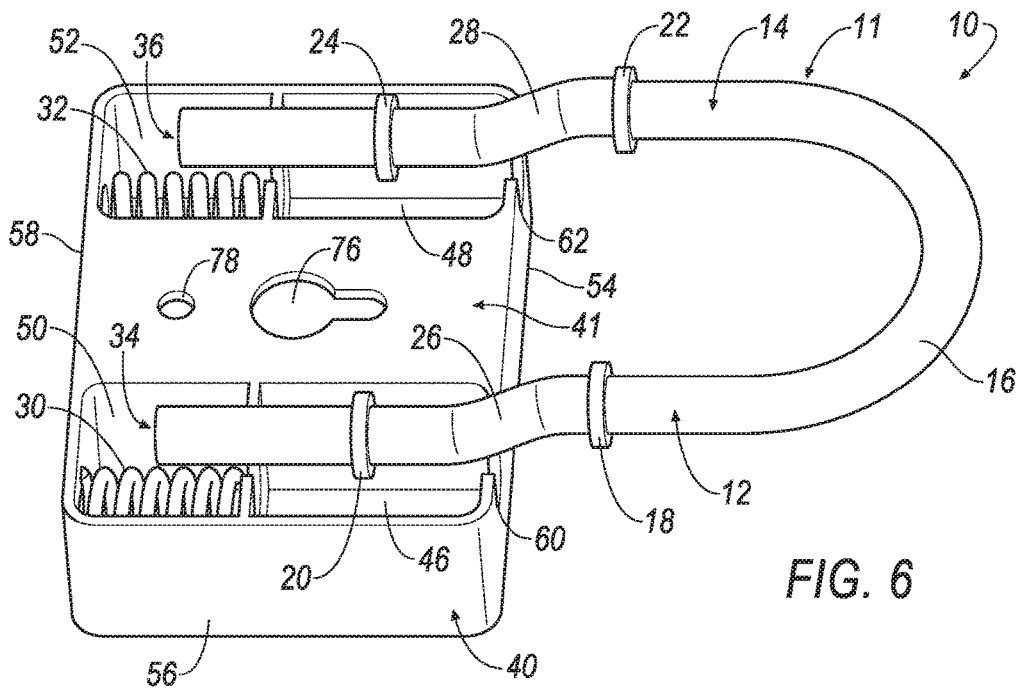
FIG. 6 is a perspective view of the tow hook of FIG. 1 in a first partial assembly condition.
Figure 7:
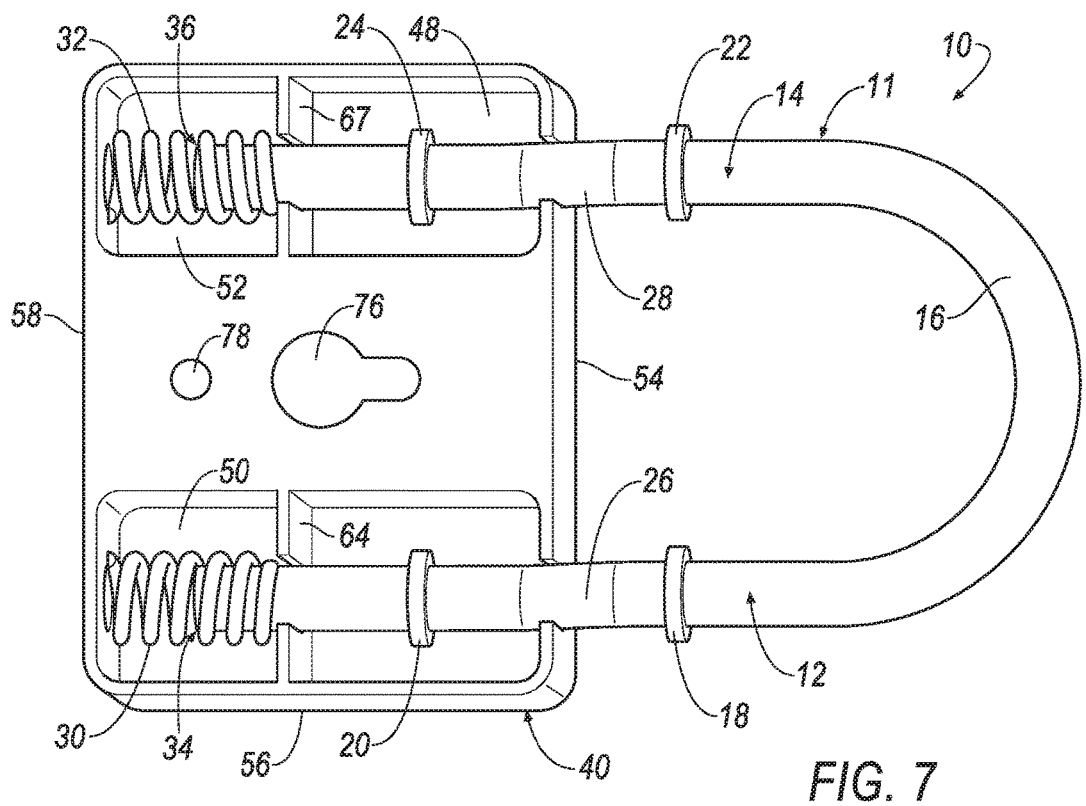
FIG. 7 is perspective view of the tow hook of FIG. 1 in a second partial assembly condition.

With reference to FIGS. 6 and 7 there is shown a method of assembling the tow hook assembly 10. In particular, the tow hook 11 may include a first leg offset portion 26 and a second leg offset portion 28. In one method of assembling the two springs 30, 32 are first placed in spring cavities 50, 52. The rod ends 34, 36 are then placed into the core of each spring 30, 32 respectively. As the rod ends 34 and 36 are pushed through springs 30, 32, the offset leg portions 26 and 28 provide clearance for the locking flanges 18, 20, 22 and 24 to be pivoted above slots 60, 62, 66 and 68 so that the rear locking flanges 20 and 22 can compress the springs 30, 32 and the forward locking flanges 18 and 22 can be positioned adjacent to the rear face 55 of the forward wall 54 and the rearward locking flanges 20, 24 can be positioned adjacent the rear face 65 of the middle wall 64. As the above compression of the springs 30, 32 is accomplished the rod ends 34 and 36 are extended through the holes 70 and 72. In this manner the tow hook 11 may be snapped or locked into the housing 40.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A tow hook assembly comprising:
    a U-shaped tow hook having first and second legs, the first and second legs each including a forward and a rearward locking flange, the U-shaped tow hook received in a housing, the housing having forward and middle walls that include first and second co-linear slots to receive the first and second legs respectively where the first and second legs each include an end, the end of the first leg extending through a first hole in an end wall of the housing and the end of the second leg extending through a second hole in the end wall of the housing; and
    first and second springs which bias each forward and rearward locking flange against the forward and middle walls adjacent the first and second co-linear slots, where the first and second springs are coil springs with the first spring surrounding the first leg and compressed between the first leg rearward flange and the first hole in the end wall and the second spring surrounding the second leg and compressed between the rearward flange of the second leg and the second hole
    wherein the first leg includes an offset portion between the forward and rearward locking flanges and the second leg includes an offset portion between the forward and rearward locking flanges.

2. The tow hook assembly as in claim 1 wherein the first and second springs have a spring constant of between 110 KN/m and 125 KN/m.

3. The tow hook assembly as in claim 2 wherein the first and second springs have a spring constant of between 117 KN/m and 118 KN/m.

4. The tow hook assembly as in claim 1 wherein the housing includes a mounting block including first and second mounting holes for receiving bolts used to attach the housing to one of a vehicle bumper beam or frame.

5. The tow hook assembly as in claim 4 wherein at least one of the mounting holes is adjustable by including differing diameters.

6. A method of assembling a tow hook assembly comprising:
    providing a U-Shaped tow hook, the U-shaped tow hook including first and second legs, the first and second leg each including forward and rearward locking flanges;
    providing a housing with a first leg cavity and a second leg cavity; the first and second leg cavities being adjacent, the first and second leg cavities each bounded by a forward housing wall and a rearward housing wall with the forward housing wall including a first leg slot and a second leg slot; the first and second leg cavities being separated by a middle wall into first and second forward cavities respectively and first and second spring cavities respectively, the middle wall including first and second slots;
    placing first and second legs into first and second coil springs and placing the first and second coil springs together with the first and second legs into the first and second spring cavities such that the first and second legs are received in the first and second leg slots of the forward housing wall and each middle tow wall respectively and the forward and rearward locking flanges of the first and second legs are adjacent the slots.

7. The method of assembling a tow hook assembly as in claim 6 wherein the first and second coil springs are first placed into the first and second spring cavities followed by placing the first and second legs through the coil springs.

8. The method of assembling as in claim 7 wherein the first and second legs are offset between the forward and rearward locking flanges.

9. The method of assembling as in claim 8 wherein rearward housing wall includes first and second holes which receive an end of the first leg and an end of the second leg.

\* \* \* \* \*